Patented Feb. 10, 1942

2,272,516

UNITED STATES PATENT OFFICE 2,272,516

MOISTURE-REACTIVATABLE ADHESIVE COMPOSITION

Earle R. Edson, Gloucester, Mass., assignor to Le Page's, Inc., a corporation of Massachusetts No Drawing. Application April 22, 1939, Serial No. 269,416

3 Claims. (Cl. 106—213)

This invention relates to a moisture-reactivatable adhesive composition useful more particularly for such purposes as making gummed tapes, labels, stickers, or the like, which present a dried film or coating of adhesive composition designed to be adhesively activated practically instantaneously upon being moistened or wetted with water. It deals more especially with an adhesive composition which, although containing a starch-conversion-product as its base, can be used advantageously in lieu of the animal glue composition heretofore customarily employed as a moisture-reactivatable adhesive composition in the manufacture of gummed tapes and similar articles.

My observation has led me to the conclusion that the nearer a starch-conversion-product approaches a native or unconverted starch, the greater is its ultimate or dry-bonding power. However, the trouble with a native or unconverted starch is that it has very little wet-bonding power and that it cannot adhesively be activated with moisture from dry film form to the desired degree or with the required rapidity even when it is compounded with an unduly large amount of adhesive-activator, for instance, so much urea as to render unduly hygroscopic a film supposed to be maintained substantially dry until ready for use.

In accordance with the present invention, I employ as the base of my moisture-reactivatable adhesive composition a starch-conversion-product whose dextrin content and cold-water-solubility are kept within minimum ranges compatible with the satisfactory use of such product as a base in a moisture-reactivatable adhesive composition, for this means that the composition partakes in large measure of the high dry-bonding power and other desirable characteristics of a native or unconverted starch. I have discovered certain essentially critical ranges of dextrin content and cold-water-solubility in a starch-conversion-product that establish its usefulness for the purposes hereof. Thus, I have found that such product should have a dextrin content ranging from about 10% to 20% and a solubility of about 30% to 50% in water at 75° F. and further that, when possessed of these characteristics, a starch-conversion-product requires no more than about 80% to 200% of its own weight of water to yield when cooked in the presence of a suitable amount of urea an aqueous adhesive composition, whose viscosity is well adapted for coating or gumming paper on conventional coating or gumming equipment, which can be dried as a coating on paper, cloth, or other backing material within a commercially satisfactory period of time, and which leaves a dried coating or film of sufficient thickness or weight to perform upon moisture-reactivation its intended function. Indeed, with such starch-conversion-product of a dextrin content of about 20%, it is possible in the presence of an appropriately restricted amount of urea to use as little as about 80% to 100% of water, based on the weight of such starch-conversion-product, in preparing a cooked aqueous adhesive composition fulfilling the various desiderata noted.

In order to enable the desired substantially instantaneous moisture-reactivation of a dried coating or film deposited from such cooked aqueous adhesive composition, the starch-conversion-product entering thereinto is compounded with a suitable amount of adhesive-activator, namely, urea, which is highly effective and otherwise satisfactory for its intended purpose. I have determined that the starch-conversion-product used for the purposes hereof requires only about 5% to 25% of urea, based on its own weight, to be moisture-reactivated practically instantaneously from dried film form, as deposited from a cooked aqueous adhesive composition containing the urea-compounded, starch-conversion-product, while developing high wet-bonding power and an ultimate or dry-bond of the improved tenacity attributable to the particular starch-conversion-product already described. It might be observed that only about 5% urea suffices with a starch-conversion product at the upper ends of the dextrin-content and cold-water-solubility ranges hereinbefore indicated, whereas no more than about 25% urea is necessary with a starch-conversion-product at the lower ends of the dextrin-content and cold-water-solubility ranges hereinbefore indicated. In any event, the urea usage is well below that tending to render the dried film or gum deposited from the cooked aqueous composition hereof so hygroscopic as to give rise, under highly humid atmospheric conditions sometimes experienced in the summer-time, to the danger of "blocking" or coalescence of the convolutions or plies of rolled tape or stacked labels or the like carrying such film or gum.

Investigation has shown the importance of using a starch-conversion-product of a dextrin content of at least about 10% for the sake of developing desirably high wet-bonding power in the moisture-reactivated gum or film deposited and dried from the cooked aqueous composition hereof. Again, such minimum dextrin content in the starch-conversion product of such composition makes possible the development substantially instantaneously of desirably high wet-bonding power in such film when it is moistened or reactivated by the usual moistening devices and when such film contains urea in amount less than about 25%, based on the weight of the starch-conversion-product, that is, urea in such limited amount as does not impart undue hygroscopicity to the film. However, one should avoid a dextrin content greater than about 20% in the base or starch-conversion-product of the adhesive composition hereof in order to ensure the desired high retention of the ultimate or dry-bonding power and other desirable characteristics inhering in the native or substantially unconverted starch. High ultimate or dry-bonding strength in a gummed tape or the like is of great importance when the tape is to be stuck to a surface of high integrity, for instance, to a high-grade Fourdrinier kraft paper facing of a shipping carton, for, unless the tape is bondable with higher tenacity to such facing than the surface tenacity or integrity of such facing, such tape may well separate from the facing under the stresses of handling or shipping the carton. The cold-water-solubility quality of the starch-conversion-product entering into the adhesive composition hereof reflects not only the extent of retention of the original or undegraded starch characteristics, including notably dry-bonding power, but also the amount of urea necessary therewith for adhesive-activating purpose; and the less degraded or depolymerized the starch-conversion-product, the lower its cold-water-solubility. A cold-water-solubility not exceeding about 50% in the starch-conversion product connotes that the original or parent starchy material has not undergone such serious degradation or depolymerization as to conduce to a display of undesirably low ultimate or dry-bonding potentiality in the film deposited from the adhesive composition hereof and, further, that such film in dried condition, as on a tape or label, is sufficiently flexible or noncrackly as to require comparatively very little, if any, glycerine or other plasticizing agent to be maintained in substantially continuous state or, if desired, subjected to fine cracking or striation under controlled conditions, as hereinafter described. On the other hand, a cold-water-solubility of at least about 30% in the starch-conversion-product bespeaks adequately rapid or substantially instantaneous moisture-reactivatability in the dried film prepared from the adhesive composition hereof when such film contains urea in amount less than about 25% of its weight and is hence of acceptably low hygroscopicity.

While not limited thereto, I shall now give formulas for the preparation of two adhesive compositions, in one of which the base or starch-conversion-product has dextrin content and cold-water-solubility values lying at the low ends of the ranges hereinbefore prescribed and in the other of which the base or starch-conversion product has dextrin content and cold-water-solubility values lying at the upper ends of the ranges hereinbefore prescribed.

*Formula #1*

| | Parts |
|---|---|
| (10% dextrin content; 30% solubility in water at 75° F.) | 100 |
| Urea | 25 |
| Water | 80 to 200 |

*Formula #2*

| | Parts |
|---|---|
| (20% dextrin content; 50% solubility in water at 75° F.) | 100 |
| Urea | 5 |
| Water | 80 to 200 |

For each of the foregoing formulas, the procedure may be to mix the ingredients and heat or cook them, as ordinarily, for a few minutes at appropriately high temperature, say, about 175° F., whereupon the resulting heated or cooked aqueous adhesive composition may be permitted to cool to the desired temperature, say, 120° to 90° F., for application to a paper backing or the like suitable for the particular article in view, for instance, a remoistening tape for sealing or binding shipping cartons or other packages. If desired, a suitable amount of glycerine, ethylene glycol, glucose, or equivalent plasticizing agent may be added to the cooked aqueous adhesive composition. As ordinarily, the paper coated with the adhesive composition may be dried and cut into tape, which may be wound into roll form and sold in such form for use as remoistening tape. It is to be understood that the cooked aqueous adhesive composition hereof may be applied, as by the usual applicator roll or other conventional gumming device, as a film of adequate weight or thickness to a progressively moving web of the paper or other suitable backing while the paper is being withdrawn from a parent roll and while the filmed or coated paper is being led through a hot-air drying chamber or over steam heated drying drums and thence to suitable cutting knives. The cut tapes or narrow bands may be wound or accumulated on cores as rolls of the desired diameter. If desired, the dried, coated web may be rewound and aged in roll form before being unwound and passed through a tape-slitting and edge-trimming machine. It might be further noted that the wet film of adhesive composition hereof, as deposited on paper or like backing, lends itself nicely to smoothing and/or polishing treatment, as by a highly polished steel roll contacting therewith as the wet, filmed paper is progressing from the applicator roll or gumming device to the drier. The dried film may be very finely cracked or striated by leading the ungummed or unfilmed back face of the backing paper or web under tension into sharp angular contact with one or more so-called breaker bars or knives in accordance with known practice, thereby reducing curling stresses in the web and promoting ingress of remoistening water into the body of the film.

In some instances, it may be advantageous to reduce the amount of urea to be associated with the starch-conversion-product in preparing the aqueous adhesive compositions hereof, for instance, Formula No. 1 composition hereinbefore described. Thus, in Formula No. 1 composition, it is possible to reduce the urea usage to about 13 to 9 parts by substituting in lieu of the eliminated portion of urea about 2 to 5 parts of sodium chloride or equivalent halide. It has been found that alkali and/or alkaline earth halides accelerate the adhesive-activating property of urea even when they are present in comparatively small amount along with the urea in the dried films deposited from the aqueous adhesive composition hereof. While I do not understand fully the mechanism underlying the accelerating effect of the alkali or alkaline earth halides upon the adhesive-activating property of urea, yet such accelerating effect may well be attributable to the greatly increased hygroscopicity or deliquescence of a mixture of urea and alkali or alkaline earth halide in comparison with either one of the constituents of such mixture. For instance, it has been observed that when a concentrated solution of substantially pure urea or substantially pure sodium chloride is exposed to the atmosphere, there is a decided tendency for the solution to evaporate sufficiently to deposit out crystals of these compounds. On the other hand, when a concentrated solution of the mixed compounds is exposed to similar atmospheric conditions, there is apt to be very little, if any, tendency for either of the compounds to crystallize or deposit from solution, owing to the greatly enhanced hygroscopicity or deliquescence of the mixed compounds. Accordingly, when replacing more or less urea by sodium chloride or equivalent halide in the aqueous adhesive composition hereof, one should control or adjust the relative percentages of the urea and the sodium chloride or its equivalent to avoid undue hygroscopicity in the film or coating of dried adhesive composition hereof intended to be reactivated by moisture, as on a tape, label, or similar article. The economic value of replacing a portion of the urea in the aqueous adhesive composition hereof by such adhesive-activator-accelerator as sodium chloride is at once apparent from the currently much lower cost of sodium chloride than urea. Moreover, the inclusion of an adhesive-activator-accelerator, such as sodium chloride, along with urea in the aqueous adhesive composition frequently enables complete elimination of the use of comparatively costly plasticizers, such as polyhydric alcohols, in the manufacture of gummed tapes, labels, and similar articles. Further, the presence of an adhesive-activator-accelerator, like sodium chloride, in the adhesive composition hereof greatly facilitates the successful use in such composition of a starch-conversion-product having the dextrin content and cold-water-solubility values falling within the ranges hereinbefore prescribed.

It is to be understood that the producer of the starch-conversion-product may compound or mix such product with the urea and, if desired, with the sodium chloride or equivalent halide in substantially dry condition, as in a "Day" mixer, to produce a physically homogeneous mixture or compound, which may be sold to the manufacturer of the gummed tape, labels, or congeneric gummed products. In such case, the latter manufacturer may proceed to cook up the mixture in the appropriate amount of water, as already indicated, and to add to the resulting aqueous adhesive composition such comparatively small amount of plasticizing agent as may be beneficial to the particular gummed product being manufactured. In other instances, such latter manufacturer may prepare the aqueous adhesive composition hereof from the starch-conversion-product, urea, and, if desired, sodium chloride or equivalent halide purchased apart from one another.

The dextrin content as given in the foregoing description and in the appended claims for the starch-conversion-product is determined by the method of Babington, Tingle, and Watson, as described under the caption "The examination of commercial dextrin and related starches," in the Journal of the Society of Chemical Industry, vol. 37 (1918), p. 257. The cold-water-solubility as given in the foregoing description and in the appended claims for the starch-conversion-product is determined by adding 5 parts of such product in bone-dry condition to 100 parts of water at 75° F., mixing such product in the water for not less than about 3 hours, at the end of which time the dissolution of the soluble solids is ensured, and then filtering the resulting aqueous suspension through filter paper of sufficient thickness and pore-fineness to ensure efflux of a substantially clear filtrate. Thus, a high-grade "Swedish" filter paper, such as is ordinarily used for analytical laboratory work, may serve in making my test for cold-water-solubility. The filter paper carrying the undissolved accumulation or starch-conversion-product residue is dried at, say, 230° F., to bone-dryness and weighed. The undissolved starch residue may then be readily calculated from the original or bone-dry weight of the filter paper and the percentage of the soluble and insoluble solids in the starch-conversion-product readily evaluated.

The expression "starch-conversion-product," as used herein, is meant to include partially dextrinized starch products having the particular dextrin content and water-solubility values hereinbefore prescribed, irrespective of the particular starchy or amylaceous substance used as the parent or starting material, which latter may be of such widely varying origin as tapioca or sago flour, the starches of maize, wheat, etc., and starches containing more or less protein or other matter. The parent or native starchy material may be converted or partially dextrinized into the particular product useful for the purposes hereof by the calcination or heat treatment of such material in substantially dry state but under correlated conditions of calcination or heat treatment controlled to yield a product having the particular dextrin content and cold-water-solubility values hereinbefore prescribed. The calcination or heat treatment of the parent or native starch may be performed in the presence of a limited or controlled amount of moisture and/or volatile mineral acid, such as hydrochloric, as is known to those skilled in the art. Because it is possible to control the plurality of factors at play during the calcination or heat treatment in preparing the particular starch-conversion-product necessary for the purposes hereof, including such factors as the initial, intermediate, and final temperatures of the heat treatment, and/or the time of the heat treatment, and/or the amount of moisture and/or the amount and particular kind of volatile mineral acid present in the starchy material being heat-treated, it is hardly necessary for me to state the details of any particular heat treatment or calcination. Suffice it to say that those skilled in the art will have no difficulty in selecting various combined or correlated heat-treating or calcining conditions conducive to a starch-conversion-product useful for the purposes hereof; and such combined or correlated conditions will, of course, depend also on the character and origin of the parent or native starchy substance employed as raw material.

I claim:

1. A moisture-reactivatable adhesive composition especially adapted for gummed tape or the like and capable of being adhesively activated practically instantaneously upon being moistened or wetted with water, which comprises as its adhesive base a starch-conversion product having a dextrin content of about 10% to 20%, and a solubility in water at 75° F. not exceeding about 50%, which contains as an adhesive activator urea in an amount of about 5% to 13%, based on the dry weight of said starch-conversion product, and which additionally contains as an accelerator of the adhesive-activating property of the urea about 2% to 5% dry weight of a compound selected from the group consisting of alkali metal halides and alkaline earth metal halides, said 2% to 5% being based on the dry weight of said starch-conversion product.

2. A moisture-reactivatable adhesive composition especially adapted for gummed tape or the like and capable of being adhesively activated practically instantaneously upon being moistened or wetted with water, which comprises as its adhesive base a starch-conversion product having a dextrin content of about 10% to 20%, and a solubility in water at 75° F. not exceeding about 50%, which contains as an adhesive activator urea in an amount of about 5% to 13%, based on the dry weight of said starch-conversion product, and which additionally contains as an accelerator of the adhesive-activating property of the urea about 2% to 5% dry weight of sodium chloride, based on the dry weight of said starch-conversion product.

3. A moisture-reactivatable adhesive composition especially adapted for gummed tape or the like and capable of being adhesively activated practically instantaneously upon being moistened or wetted with water, which comprises as its adhesive base a starch-conversion product having a dextrin content of about 10% to 20% and a solubility in water at 75° F. not exceeding about 50%, which contains as an adhesive activator urea in amount of about 9% to 13%, based on the dry weight of said starch-conversion product, and which additionally contains as an accelerator of the adhesive-activating property of the urea about 2% to 5% dry weight of sodium chloride, based on the dry weight of said starch-conversion product.

EARLE R. EDSON.